(12) United States Patent
Quiros

(10) Patent No.: US 10,285,044 B2
(45) Date of Patent: *May 7, 2019

(54) HOTEL COMMUNICATION SYSTEMS AND METHODS

(71) Applicant: CAMPOSAGRADO, INC., Colorado Springs, CO (US)

(72) Inventor: José P. Quiros, Colorado Springs, CO (US)

(73) Assignee: Camposagrado, Inc., Colorado Springs, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/614,196

(22) Filed: Jun. 5, 2017

(65) Prior Publication Data

US 2017/0272934 A1   Sep. 21, 2017

Related U.S. Application Data

(63) Continuation of application No. 14/877,595, filed on Oct. 7, 2015, now Pat. No. 9,674,692.

(51) Int. Cl.
*H04W 48/02* (2009.01)
*H04W 8/18* (2009.01)
(Continued)

(52) U.S. Cl.
CPC ............ *H04W 8/183* (2013.01); *G06Q 10/02* (2013.01); *G06Q 30/0241* (2013.01);
(Continued)

(58) Field of Classification Search
CPC ........ H04W 8/20; H04W 4/023; H04L 69/14; H04L 67/303; H04L 41/00816;
(Continued)

(56) References Cited

U.S. PATENT DOCUMENTS 7,162,020 B1 * 1/2007 Forte ................. H04M 3/42263
379/201.01
9,674,692 B2   6/2017 Quiros
(Continued)

FOREIGN PATENT DOCUMENTS

WO        2013049730 A1    4/2013

OTHER PUBLICATIONS

International Search Report and Written Opinion for PCT/US2016/053009 dated Dec. 9, 2016.
(Continued)

*Primary Examiner* — Phuoc H Doan
(74) *Attorney, Agent, or Firm* — Stoel Rives LLP; R. Whitney Johnson

(57) ABSTRACT

The present disclosure provides systems and methods for communicating with a hotel, for example, by establishing calls from a mobile communication device as an extension of a PBX of the hotel. The mobile communication device can receive, by a network interface, guest registration data for a guest of the hotel, including the room assignment and one or more guest service extensions on the PBX. The mobile communication device can store the guest registration data in electronic memory to configure the one or more guest service keys with the one or more guest service extensions. The mobile communication device can based on a selection of a key of one or more guest service keys, communicate directly with the PBX, by the network interface, to place and receive calls as an extension of the PBX associated with the hotel room assignment.

10 Claims, 8 Drawing Sheets

(51) Int. Cl.
  *G06Q 10/02* (2012.01)
  *G06Q 30/02* (2012.01)
  *H04M 1/725* (2006.01)
  *H04M 7/00* (2006.01)
  *H04W 4/02* (2018.01)
  *H04M 3/42* (2006.01)
  *H04M 1/253* (2006.01)
  *H04W 88/06* (2009.01)

(52) U.S. Cl.
  CPC ..... *H04M 1/2535* (2013.01); *H04M 1/72561* (2013.01); *H04M 3/4234* (2013.01); *H04M 7/009* (2013.01); *H04W 4/023* (2013.01); *H04M 2203/1083* (2013.01); *H04W 88/06* (2013.01)

(58) Field of Classification Search
  CPC ............. G06F 9/547; G06Q 10/06315; G06Q 10/08355; G06Q 20/102; G07C 9/00904; G07C 9/00111; G07C 9/00817; H04M 3/42263
  USPC .................. 455/418; 340/12.53; 379/201.01, 379/167.02; 726/1, 3, 6; 705/40; 398/130
  See application file for complete search history.

(56) References Cited

U.S. PATENT DOCUMENTS

| | | |
|---|---|---|
| 2003/0208386 A1 | 11/2003 | Brondrup |
| 2008/0279117 A1 | 11/2008 | Brisco et al. |
| 2013/0209108 A1* | 8/2013 | Krishnakumar ........ H04L 69/14 398/130 |
| 2015/0156616 A1 | 6/2015 | McComb et al. |

OTHER PUBLICATIONS

Office Action dated Nov. 2, 2016, in U.S. Appl. No. 14/877,595, filed Oct. 7, 2015.

Notice of Allowance dated Mar. 22, 2017, in U.S. Appl. No. 14/877,595, filed Oct. 7, 2015.

* cited by examiner

HOTEL COMMUNICATION SYSTEMS AND METHODS

RELATED APPLICATIONS

This application is a continuation of U.S. patent application Ser. No. 14/877,595, titled "HOTEL COMMUNICATION SYSTEMS AND METHODS," filed Oct. 7, 2015, which is hereby incorporated by reference herein in its entirety.

COPYRIGHT NOTICE

© 2017 Camposagrado, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to hotel communications. In particular, the present disclosure relates to systems and methods for interfacing with a hotel, including placing calls via a private branch exchange system (PBX) and/or interacting with a property management system (PMS) associated with a hotel.

BACKGROUND

Hotel communication systems may include a private branch exchange system (PBX) and a property management system (PMS). A PBX is a system that connects telephone extensions to the Public Switch Telephone Network. The PBX may also provide internal communications for a hotel. That is, the PBX may couple telephone extensions within a hotel such that a telephone call can be placed from a first extension to a second extension. The extensions of the PBX may allow a call to be placed from a first telephone in a first room of the hotel to second telephone in a second room of the hotel.

The PMS may facilitate the management of property. The PMS may be used by a hotel to coordinate the operational functions of the hotel. The PMS may coordinate guest details, reservations, human resource actions, payments, and payrolls.

Presently, guest communications with the hotel and with other guests at the hotel occurs via a handset located within a guestroom or other location within the hotel.

SUMMARY

The present disclosure provides systems and methods for communicating with a hotel, for example, by establishing calls from a mobile communication device as an extension of a PBX of the hotel. The mobile communication device can receive, by a network interface, guest registration data for a guest of the hotel, including the room assignment and one or more guest service extensions on the PBX. The mobile communication device can store the guest registration data in electronic memory to configure the one or more guest service keys (e.g., memory keys) with the one or more guest service extensions. The mobile communication device can, based on a selection of a key of one or more guest service keys, communicate directly with the PBX, by the network interface, to place and receive calls as an extension of the PBX associated with the hotel room assignment. The mobile communication device can also, based on the selection of a key of one or more guest service keys, communicate directly with the PMS to request services at the hotel, such as making reservations at the restaurant, spa, or for a future stay, ordering a cab, requesting a wake-up call, and the like.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
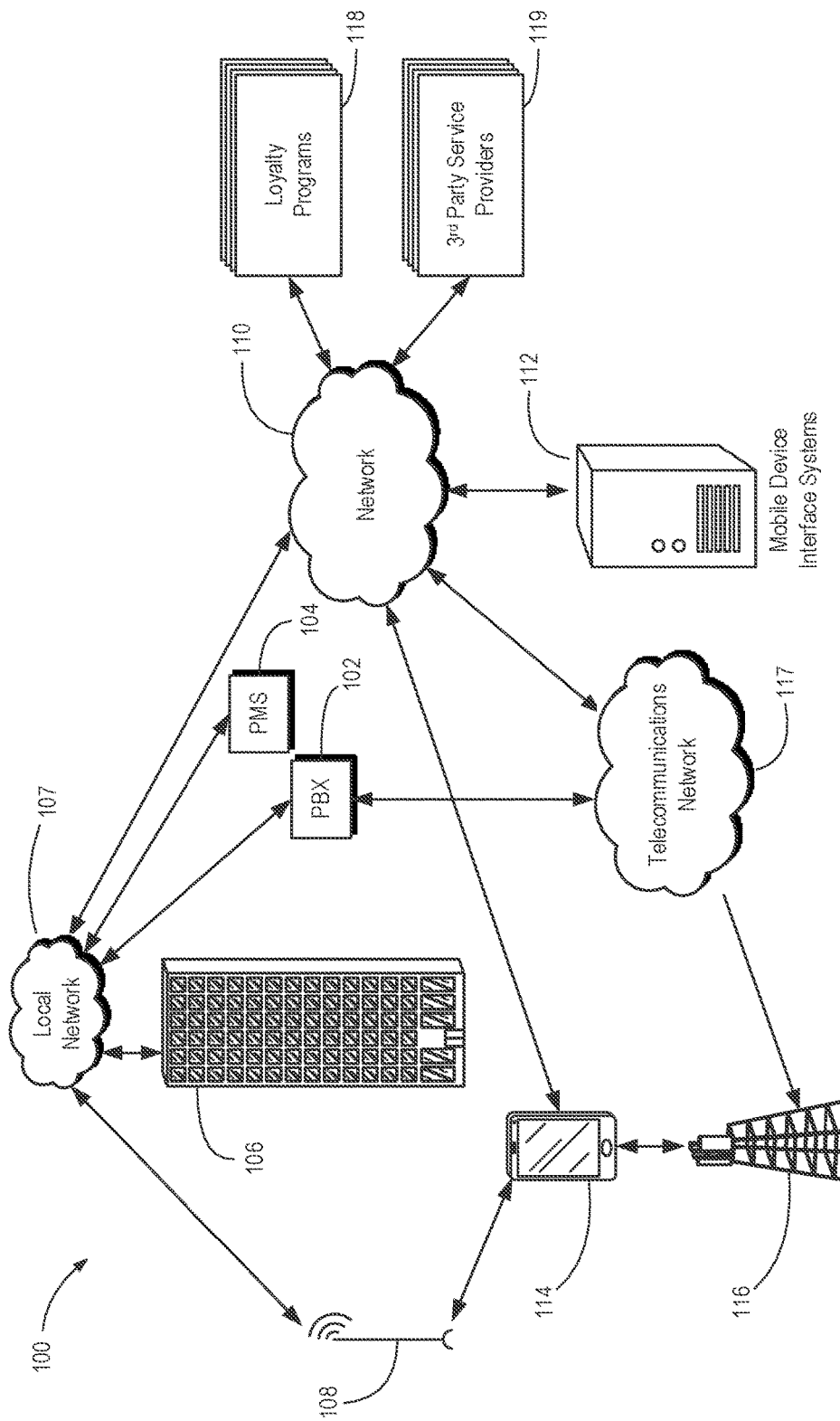
FIG. 1 is a system diagram for hotel communications according to one embodiment.

Hotels can include a communication system that can allow a guest of the hotel to place calls and receive calls at a telephone in a room of the hotel. However, in presently available hotel communication system, the guest can be limited to placing calls and receiving calls using an in-room telephone (e.g., a physical handset provided by the hotel) that is connected to the hotel communications system. For example, the guest might not be able to place calls and receive calls if the guest is not in an assigned room.

In a number of embodiments, a hotel communication system can include a private branch exchange system (PBX) and/or a property management system (PMS). As used herein, the PBX is a system that connects hotel extensions to the Public Switch Telephone Network. The PBX can also provide internal communications for a hotel. For example, the PBX can allow communications between telephones assigned different extensions numbers.

The PMS can facilitate the management of property. For example, the PMS can be used by a hotel to coordinate the operational functions of the hotel. Hotel operational functions can include coordinating guest data, guest reservation data, room assignments, human resource actions, on-site amenity reservations, and/or payrolls, among other operational functions In certain embodiments of the present disclosure, the PBX and the PMS associated with a hotel can be accessed by a mobile communication device to provide hotel communication services. That is, embodiments of the present disclosure can provide a mobile communication device with the ability to place and receive calls as an extension of the PBX and the ability to interface with the hotel via the PMS. Providing the mobile communication device the ability to place and receive calls as an extension of the PBX can provide a guest the ability to place and receive calls without being bound to a telephone and/or a room of the hotel. For example, a guest can place and receive calls within the premise of the hotel and/or within a predetermined distance from the hotel. A guest can request service from a mobile communication device as an extension of the PBX. The embodiments described herein provide a guest the ability to place and receive calls from an extension associated with a hotel room assignment without being present at the hotel room.

Although hotels are described in association with a number of examples used, the embodiments described are not limited to hotels. For example, certain embodiments can provide for communications for business, property management, and/or government applications, among other types of applications, using a PBX and/or a PMS.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system diagram for hotel communications according to one embodiment. A system 100 for providing hotel communications includes a PBX 102, a PMS 104, a hotel 106, a local network 107, a wireless local area network (WLAN) 108, a network 110, a mobile device interface system 112, a mobile communication device 114, a cell tower 116, a telecommunications network 117, one or more loyalty programs 118, and one or more third party service providers 119.

A hotel communications system 100 can include the local network 107 that couples the PBX 102, the PMS 104, and/or the WLAN 108 to the hotel 106. For example, the PMX 102 and/or the PMS 104 can be housed in the hotel 106 but are not limited to being housed in the hotel 106. For example, the PBX 102 and/or the PMS 104 can be housed externally from the hotel 106. The PMS and/or the PBX may be implemented and/or execute on a remote system, such as centrally hosted service on a server remote from the hotel 106. The PBX 102 and/or the PMS 104 can be coupled to the hotel 106 via the network 110 (e.g., a public network such as the Internet) to provide communication services to the hotel 106.

As used herein, a hotel 106 can describe any establishment that provides short-term lodging for a fee. The hotel 106 can include homes for rent on a temporary basis by owners (e.g., VRBO), motels, time shares, destination clubs, extended stay hotels, economy and limited service hotels, hostels, inns, full service hotels, and/or luxury hotels, among other types of hotels. The hotel 106 can include not just a building, but also the premises of the hotel building, and potentially neighboring premises within close proximity of the hotel. For example, the hotel 106 can include swimming pools, gyms, restaurants, and/or theaters within the premises of the hotel, or within close proximity to the hotel 106. The hotel 106 can offer services to guests. The services can also be considered as part of the hotel 106. For example, the hotel 106 can provide entertainment services, communication services, and/or eatery services, among other types of services. Although a single hotel is shown in FIG. 1, it is to be understood that the mobile communication device 114 can be configured to establish calls with one of multiple hotels as an extension of each hotels associated PBX.

The local network 107 can be an electronic communication network, such as a private network or local area network (LAN) that interconnects computing devices within the hotel 106. For example, the local network 107 can interconnect computing devices associated with the PBX 102 and/or the PMS 104. The local network 107 can also interconnect reception computing devices of the hotel with the PBX 102 and/or the PMS 104. The local network 107 can further interconnect telephones, computing devices associated with the WLAN 108, and/or mobile communication devices 114.

A mobile communication device 114 can include mobile computing devices. For example, a mobile communication device 114 can include a cell phones, laptops, tablets, and/or media players, among other types of mobile communication devices 114. The mobile communication device 114 can communicate with the PBX 102 via the WLAN 108 and the local network 107 to place and receive calls as an extension of the PBX 102. A mobile communication device 114 is further described in association with FIG. 3. Although a single mobile communication device 114 is shown in FIG. 1, it is to be understood that the hotel 106 can provide communications services to multiple mobile communication devices as an extension of the PBX 102.

The WLAN 108 is a wireless computer network that links devices using wireless distribution methods within the premises of a hotel. The WLAN can be operable on the premises of the hotel and can comprise one or more access points to the local network 107. Each access point of the WLAN can transmit and receive radio frequency signals with client computing devices, including mobile communication devices (e.g., mobile communication device 114) of guests of the hotel 106.

A cell tower 116 can include an antennae and electronic communications equipment placed on a tower to couple the mobile communication device 114 to the telecommunications network 117. The electronic communications equipment can include transmitter and/or receiver transceivers, digital signal processors, control electronics, and backup power supplies, among other electronic communications equipment. The cell tower 116 can provide the mobile communication device 114 the ability to place and receive calls without using an extension of the PBX 102, providing the mobile communication device 114 options for placing and receiving calls. For example, if placing and receiving certain types of calls through the PBX 102 would incur a charge for a guest, then the guest may place and receive calls using the telecommunications network 117 via the cell tower 116.

The PBX 102 can connect telephone extensions within the hotel 106 and/or can connect telephone extensions within the hotel 106 to the telecommunications network. The PBX 102 can connect telephone extensions within the hotel 106 to the telecommunications network 117 to place and receive local calls and/or long distance calls. In a number of embodiments, the PBX 102 can be coupled directly to the telecommunications network 117 and/or the PBX 102 can be coupled to the telecommunications network 117 via internet protocol (IP) connectivity. The telecommunications network 117 can be a telephone network used for making calls between two or more parties. The telecommunications network 117 may include, for example a third-party wireless telephone network.

The PBX 102 can be an IP PBX that provides audio, video, and/or instant messaging communications, for example, utilizing transmission control protocol (TCP)/IP protocol stacks. As such, the PBX 102 can provide the mobile communication device 114 the ability to place and receive calls utilizing audio, video, and/or instant messaging as an extension of the PBX 102. For example, an IP PBX can provide a guest the ability to request towels by providing a text message to the PBX 102, such that the guest sends a text message as an extension of the PBX 102. In certain embodiments, a text message sent as an extension of the PBX 102 may be automatically directed to the PMS 104 for processing. The PMS 104 may direct messages to a queue for handling by hotel staff.

The network 110 can describe a network external to the hotel 106 and/or the local network 107. For example, the network 110 can be the Internet or a world wide web. The network 110 can couple the telecommunications network 117 and/or the mobile device interface system 112 to the local network 107 and/or the hotel 106. The network 110 can also couple the mobile communication device 114 to the mobile device interface system 112 and/or the mobile communication device 114.

The mobile device interface system 112 can provide data to the mobile communication device 114 to configure the mobile communication device 114 to place and receive calls as an extension of the PBX 102. For example, the mobile device interface system 112 can obtain or otherwise receive guest data, hotel guest registration data, PBX extension data (including one or more extensions of the PBX 102 for given services at the hotel 106), and/or configuration data and provide the received data to the mobile communication device 114. The mobile device interface system 112 can also gather loyalty program data from loyalty programs 118. The mobile device interface system 112 can also gather advertisement data and/or services data from the third party service providers 119. The loyalty programs 118 and/or the third party service providers 119 can be coupled to the mobile device interface system 112 via the network 110.

The configuration data can include information regarding ports, hotel location, IP addresses, among other types of configuration data. Port information can include a port number for communicating with the PBX 102 and/or the PMS 104. IP addresses can include the IP address of the mobile communication device 114. The configuration data can also include authorization codes to authenticate the mobile communication device 114 with the hotel 106 and/or the mobile device interface system 112. The configuration data can also include guest name, a hotel room assignment, hotel dial codes for services (e.g., room service #2543), hotel data such as an address, and/or a telephone number for the hotel.

Figure 2:
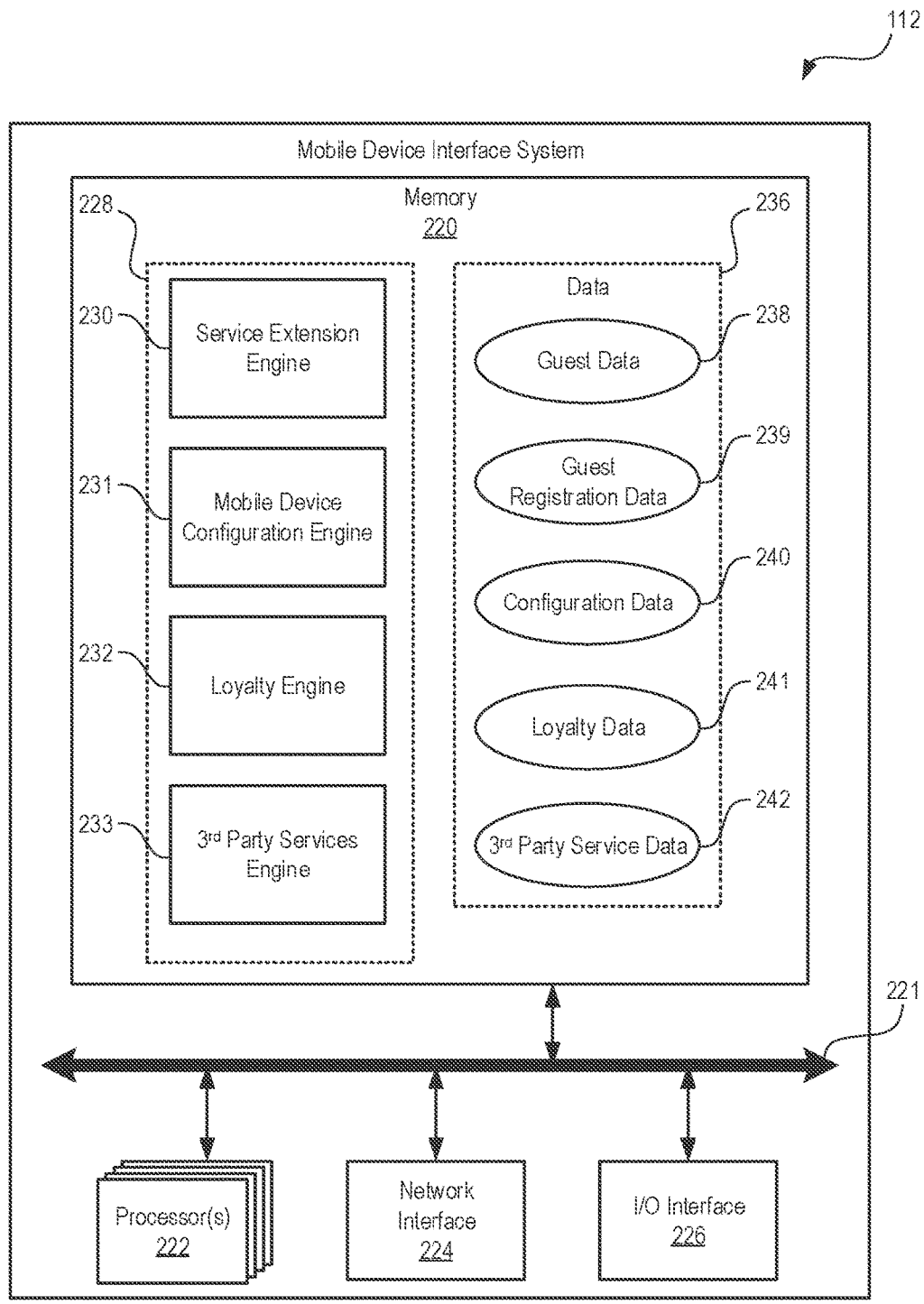
FIG. 2 is a block diagram of a mobile device interface system according to one embodiment.

FIG. 2 is a block diagram of a mobile device interface system 112 according to one embodiment. The mobile device interface system 112 can provide data to the mobile communication device 114 (FIG. 1) to configure the mobile communication device 114. The mobile device interface system 112 can include a memory 220, one or more processors 222, a network interface 224, an input/output interface 226, and a system bus 221. The mobile device interface system 112 may be the same as or analogous to the mobile device interface system 112 in FIG. 1.

The one or more processors 222 may include one or more general purpose devices, such as an Intel®, AMD®, or other standard microprocessor. The one or more processors 222 may include a special purpose processing device, such as ASIC, SoC, SiP, FPGA, PAL, PLA, FPLA, PLD, or other customized or programmable device. The one or more processors 222 can perform distributed (e.g., parallel) processing to execute or otherwise implement functionalities of the presently disclosed embodiments. The one or more processors 222 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 220 may include static RAM, dynamic RAM, flash memory, one or more flip-flops, ROM, CD-ROM, DVD, disk, tape, or magnetic, optical, or other computer storage medium. The memory 220 may include a plurality of program modules 228 and program data 236. The memory 220 may be local to the mobile device interface system 112, as shown, or may be distributed and/or remote relative to the mobile device interface system 112.

The program modules 228 may include all or portions of other elements of the system 112. The program modules 228 may run multiple operations concurrently or in parallel by or on the one or more processors 222. In some embodiments, portions of the disclosed modules, components, and/or facilities are embodied as executable instructions embodied in hardware or in firmware, or stored on a non-transitory, machine-readable storage medium, such as the memory 220. The instructions may comprise computer program code that, when executed by a processor and/or computing device, cause a computing system (such as the processors 222 and/or the mobile device interface system 112) to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 220 may also include program data 236. Data generated by the system 112, such as by the program modules 228 or other modules, may be stored on the memory 220, for example, as stored program data 236. The stored program data 236 may be organized as one or more databases. In certain embodiments, the program data 236 may be stored in a database system. The database system may reside within the memory 220. In other embodiments, the program data 236 may be remote, such as in a distributed computing and/or storage environment. For example, the program data 236 may be stored in a database system on a remote computing device.

The input/output interface 226 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 224 may facilitate communication with other computing devices and/or networks such as the network 110 in FIG. 1 and/or other computing and/or communications networks such as a local network 107 in FIG. 1. The network interface 224 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 224 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 221 may facilitate communication and/or interaction between the other components of the system, including the one or more processors 222, the memory 220, the input/output interface 226, and the network interface 224.

As noted, the mobile device interface system 112 also includes various program modules 228 (or engines, elements, or components) to implement functionalities of the system 112, including a service extension engine 230, a mobile device configuration engine 231, a loyalty engine 232, and/or an advertisement engine 233. These elements may be embodied, for example, at least partially in the program modules 228. In other embodiments, these elements may be embodied or otherwise implemented in hardware of the system 112. The system 112 also includes guest data 238, guest registration data 239, configuration data 240, loyalty data 241, and third party services data 242 that may be stored in the program data 236 which may be generated, accessed, and/or manipulated by the program modules 228.

The service extension engine 230 is configured to receive guest data 238 and guest registration data 239. The service extension engine 230 is also configured to receive configuration data 240 from the PBX and/or the PMS via network 110.

Guest data 238 can include information of one or more guests of the hotel 106 (FIG. 1) and other hotels. The guest data 238 can include, for example, a guest's name, a guest's phone number, and/or a guest's permanent address, among other guest data. The guest registration data 239 can include data pertaining to a registration of the hotel 106. For example, guest registration data 239 can include a hotel room assignment for a guest, a start date of the registration, a closing date of the registration, and/or other dates associated with the registration of the guest of the hotel 106. The guest registration data 239 can also include a phone number that can be used to call the extension associated with the hotel room assignment. The guest registration data 239 can include other data pertinent to a guest registration with the hotel 106. The guest registration data can be received from the PMS 104 (FIG. 1) via the network 110 (FIG. 1).

The configuration data 240 can include data used to configure the guest service application and/or a mobile communication device. The configuration data 240 can include service extensions, hotel room extensions and/or extensions for services offered by the hotel 106. The configuration data 240 can also include IP address information for the mobile communication device and/or a port number for communicating with the PBX, either over a local network 107, the network 110, and/or a telecommunication network 117 (FIG. 1). The configuration data 240 may include other information that enables the direct interfacing with the PBX.

The configuration data 240 can be received from the PBX 102 and/or the PMS 104 via the network 110 (FIG. 1). The mobile device interface system 112 may include listings of configuration data 240, including service extensions, for multiple hotels, such that configuration data 240 appropriate for a given hotel may be available upon guest check-in at the given hotel. Similarly, when the same guest checks in at a different hotel, the configuration data 240 appropriate for the new hotel may be provided.

In certain embodiments, the configuration data 240 can be compiled distinctly for a guest of the hotel 106. The configuration data 240 can be compiled or otherwise gathered from the PBX 102 of the hotel 106 and other hotels. The configuration data 240 can include extensions specifically associated with the hotel 106 where the guest has registered (e.g., check in to the hotel), in order to enable communication via the hotels PBX with desired services of that hotel 106. As can be appreciated, the configuration data 240 may include extensions for a different hotel, were the guest to check into the different hotel. In other words, the configuration data 240 may include listings of extensions for multiple hotels for which the presently disclosed hotel communication systems may enable guest interaction with the hotel. The configuration data 240 can include, for example, a subset of the extensions that comprise the PBX 102 (FIG. 1). The configuration data 240 can include extensions to hotel rooms to which a guest has communication access. The configuration data 240 can include extensions associated with services to which the guest has access. For example, the guest may have access to restaurant services but not personal chef services. As such, the configuration data 240 can include extensions to restaurants within the hotel 106 but not extensions to personal chefs within the hotel 106.

Additionally, the configuration data 240 may have a priority for the service extensions. For example, if a guest is associated with a number of extensions of hotel rooms, then the number of extensions of hotel rooms may have priority as pertaining to a display of a graphical user interface of a mobile communication device over other extensions. The configuration data 240 can also include extensions associated with a front desk, extensions associated with maintenance, and/or extensions associated with emergency personnel associated with the hotel 106.

The service extension engine 230 can also be configured to store the configuration data 240, the guest data 238, and/or the guest registration data 239 in the memory 220. The service extensions engine 230 can save the configuration data 240, the guest data 238, and/or the guest registration data 239 as the data becomes available. For example, the guest data 238 and/or the guest registration data 239 may be received before the configuration data 240 are received. In which case, the guest data 238, and/or the guest registration data 239 may be saved to memory 220 before the configuration data 240 are saved to memory 220. Similarly, or alternatively, the configuration data 240 may be received when the hotel 106 determines to provide guests with mobile communication device interaction with the hotel 106 and, for example, registers with the disclosed embodiments.

The loyalty engine 232 can be configured to receive loyalty data 241 from a loyalty program 118 (FIG. 1). The loyalty data 241 can be specific to a guest. For example, the loyalty data 241 can be received from a loyalty program 118 after a loyalty program 118 receives the guest data and/or the guest registration data 239. In an embodiment, the loyalty engine 232 can provide the guest data 238 and/or the guest registration data 239 to the loyalty programs 118. The loyalty programs 118 may also receive the guest data 238 and/or the guest registration data 239 from the PMS 104. The loyalty engine 232 may enable the guest to apply loyalty points toward a current stay at the hotel, such as to receive a discounted or otherwise reduced rate for the stay. The loyalty engine 232 may connect to the PMS 104.

The loyalty data 241 can include offers for services that are particular to the guest. For example, the loyalty data 241 can include discounts to services offered by the hotel 106 and/or by third party service providers 119 (FIG. 1). The loyalty data 241 can also include information particular to the points, frequent flier programs, and/or other incentives for purchasing services.

The third party services engine 233 can be configured to receive data 242 for third party services. The data 242 can be particular to the hotel 106 and/or a guest of the hotel 106 (FIG. 1). For example, the third party services data 242 can include services that are offered within a predetermined distance of the hotel 106. The third party services data 242 can include service providers that are affiliated with the hotel 106 and/or service providers that are not affiliated with the hotel 106. The third party services data 242 can include paid advertisement and/or non-paid advertisement. For example, a third party service provider 119 (FIG. 1) can pay the hotel 106 and/or the mobile device interface system 112 to provide priority to the service provider's services over other services. The priority can include listing the paid services before other services as displayed by the mobile communication device 114 (FIG. 1). The priority can include providing a listing of the paid services on a home view displayed by the mobile communication device 114 (e.g., banner add 582 in FIGS. 5 and 6).

The mobile device configuration engine 231 can be configured to provide the guest data 238, the guest registration data 239, the configuration data 240, the loyalty data 241, and/or the third party services data 242 to the mobile communication device 114 via network interface 224. The mobile device configuration engine 231 can provide the data 236 to the mobile communication device 114 (FIG. 1) after the mobile communication device 114 registers with the mobile device interface system 112.

The mobile communication device 114 (FIG. 1) can register with the mobile device interface system 112 by providing the mobile device interface system 112 with guest data that corresponds with the guest data 238 and/or the guest registration data 239. The mobile communication device 114 can also register with the mobile device interface system 112 by providing a code (e.g., an identifier) to the mobile device interface system 112. The mobile communication device 114 and/or the mobile device interface system 112 can obtain the code from the hotel 106. The mobile device interface system 112 can provide, for example, the data 236 to the mobile communication device 114 if the code provided by the mobile communication device 114 matches the code received by the mobile device interface system 112 from the hotel 106.

In an embodiment, the mobile communication device 114 can authenticate itself with the mobile device interface system 112 by notifying the mobile device interface system 112 that the mobile communication device 114 is registering with the mobile device interface system 112. The mobile device interface system can follow a protocol to confirm the addition and the security of the mobile communication device 114. For example, the mobile communication device 114 can provide a VoIP request for comment protocols for security as well as various IP driven security protocols.

Figure 3:
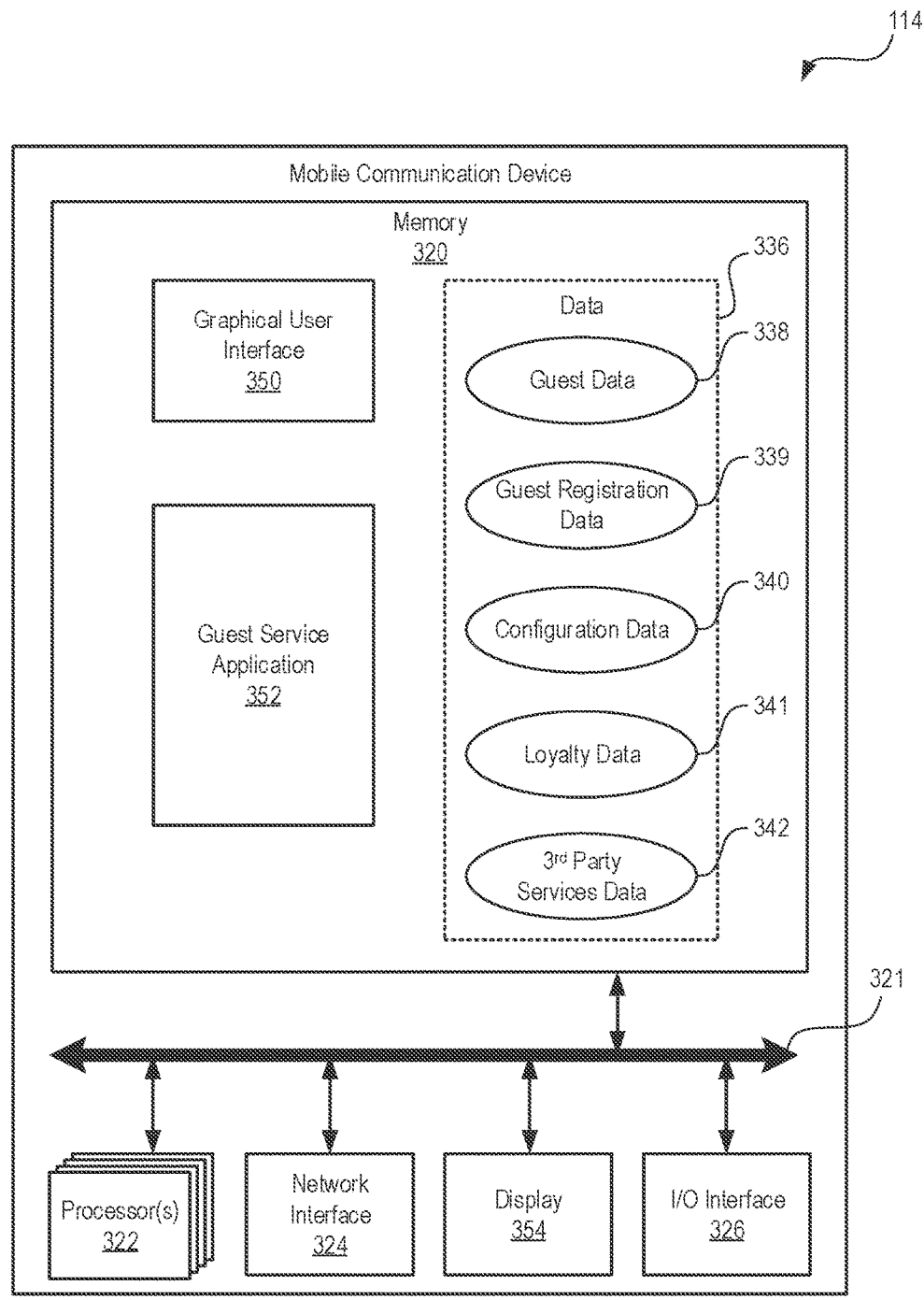
FIG. 3 is a block diagram of a mobile communication device of a hotel communication system according to one embodiment.

FIG. 3 is a block diagram of a mobile communication device of a hotel communication system according to one embodiment. The mobile communication device 114 can receive data from the mobile device interface system 112 (FIGS. 1, 2) to configure the mobile communication device 114 to interface with the hotel 106 (FIG. 1). The mobile communication device 114 can include a memory 320, one or more processors 322, a network interface 324, an input/output interface 326, and a system bus 321. In some embodiments, these components may be analogous to or otherwise have similar characteristics to the memory 220, the one or more processors 222, the network interface 224, the input/output interface 226, and the system bus 221 in FIG. 2. The mobile communication device 114 can also include a display 354.

The memory 320 may also include program data 336. Data generated by the mobile communication device 114, such as by the guest service application 352 or other modules, may be stored on the memory 320, for example, as stored program data 336. The stored program data 336 may be organized in one or more databases. In certain embodiments, the program data 336 may be stored in a database system. The database system may reside within the memory 320. In other embodiments, the program data 320 may be remote, such as in a distributed computing and/or storage environment. For example, the program data 320 may be stored in a database system on a remote computing device.

The data 336 can include guest data 338, guest registration data 339, configuration data 340, loyalty data 341, and/or third party services data 342. This data may be portions of (and analogous to) guest data 238, guest registration data 239, configuration data 240, loyalty data 241, and/or third party services data 242 in FIG. 2. The data 336 can be received from the mobile device interface system 112 (FIGS. 1, 2). For example, the guest data 338 can be received from the mobile device interface system 112 via network interface 324 through network 110 (FIG. 1). The mobile device interface system 112 communicates the guest data to the mobile communication device 114 over the network(s) 110, 107, 117 (FIG. 1), for example upon guest check-in at the hotel and/or upon the mobile communication device 114 registering with the mobile device interface system 112.

Figure 5:
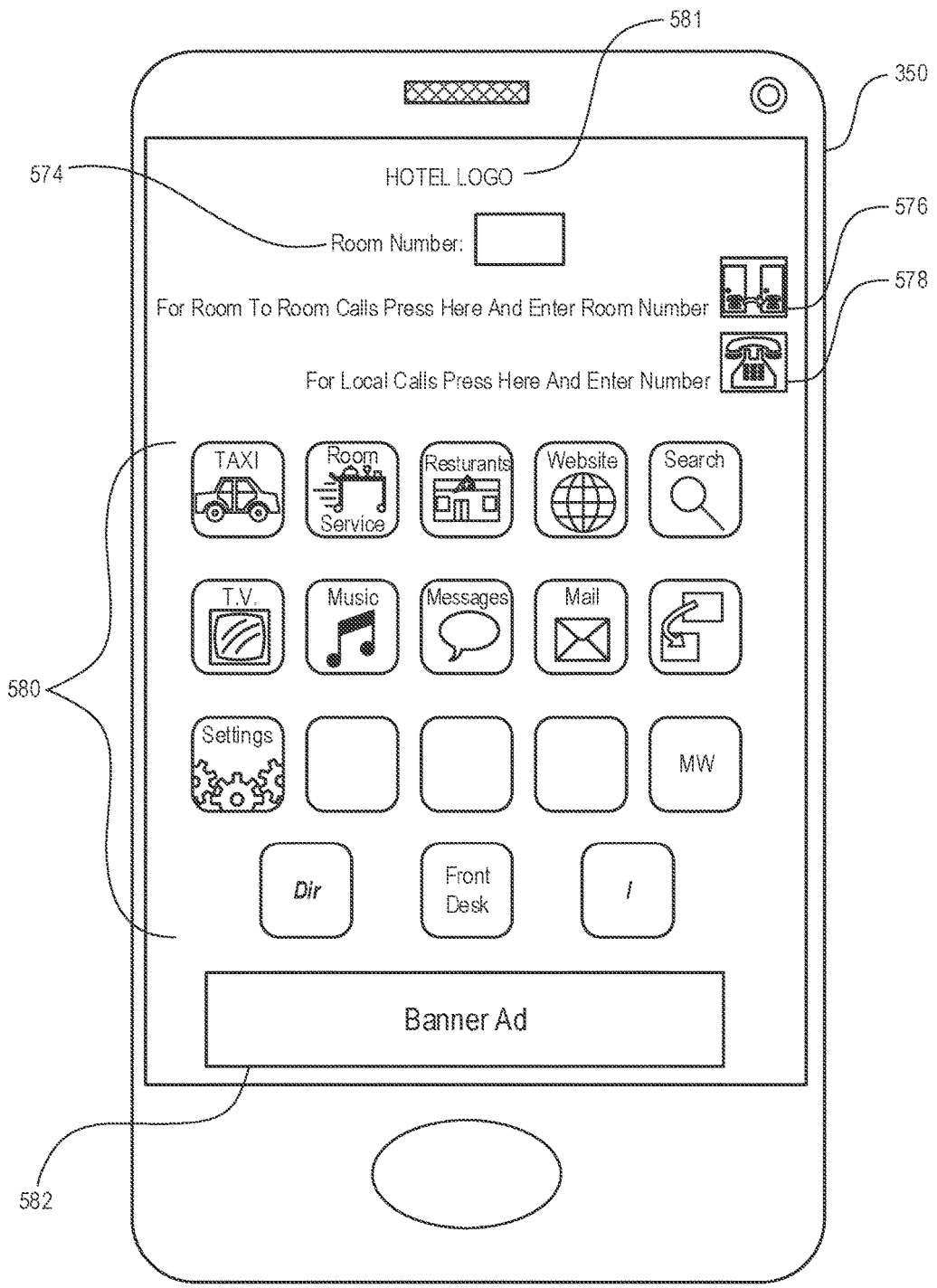
FIG. 5 graphically illustrates a graphical user interface according to one embodiment.
Figure 6:
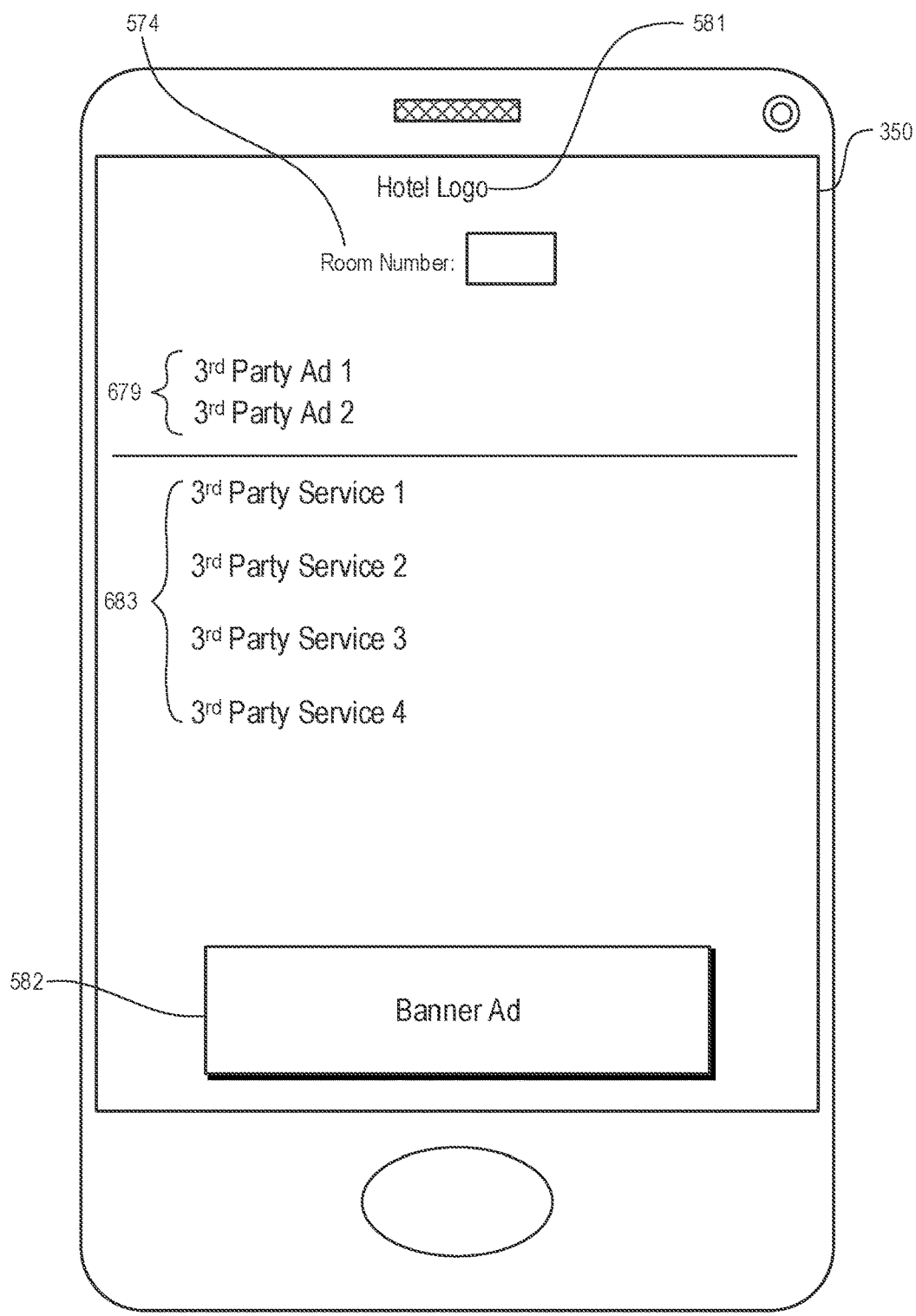
FIG. 6 graphically illustrates a graphical user interface according to one embodiment.

The mobile communication device 114 can also include a graphical user interface 350 and guest service application 352 which can be stored in memory 320. The graphical user interface can provide a graphical representation of a state of the guest service application 352 via a display 352 to a mobile communication device user (e.g., a guest of the hotel 106 (FIG. 1)). FIGS. 5 and 6 provide examples of the graphical user interface 350.

The guest service application 352 can be obtained from the hotel 106 and/or from the mobile device interface system 112. The guest service application 352 can also be obtained from a third party through an application store (e.g., iTunes®, Google Play™) and/or through a third party website.

Figure 4:
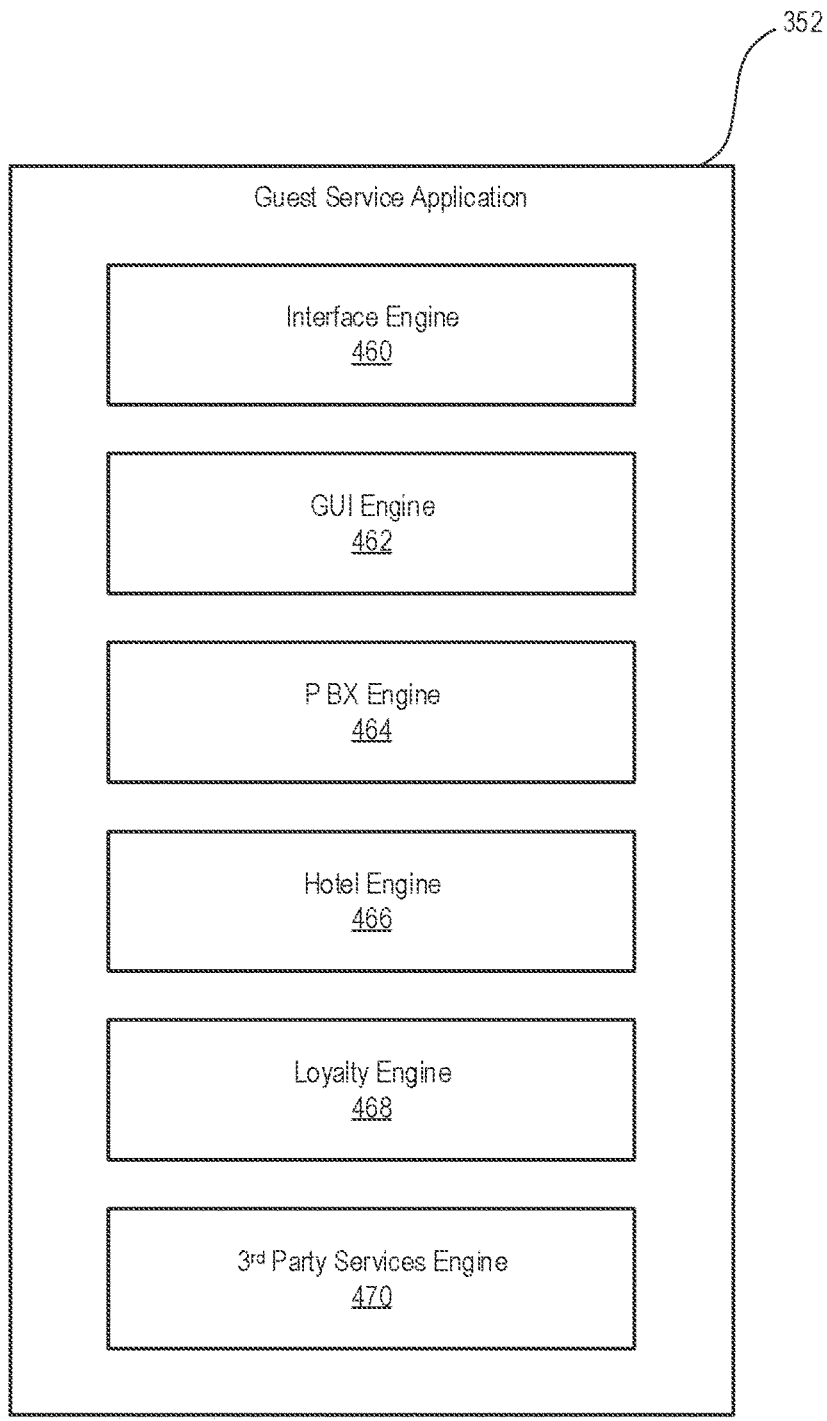
FIG. 4 is a block diagram of a guest service application according to one embodiment.

The guest service application 352 can communicate with the PBX 102 via network interface 324 to place and receive calls as an extension of the PBX 102. That is, guest service application 352 can provide the PBX 102 the guest data 338, guest registration data 339, and/or configuration data 340 to place and receive calls as an extension of the PBX 102. FIG. 4 provides an example of the guest service application 352.

FIG. 4 is a block diagram of a guest service application 352 according to one embodiment. The guest service application 352 can include an interface engine 460, a GUI engine 462, a PBX engine 464, a hotel engine 464, a loyalty engine 468, and/or a third party services engine 470.

The interface engine 460 can be configured to communicate with the mobile device interface system 112 (FIGS. 1, 2) via network interface 324 through network 110 (FIG. 1). The interface engine 460 can communicate with the mobile device interface system 112 to send and/or receive the guest data 338, the guest registration data 339, the configuration data 340, the loyalty data 341, and/or the third party services data 342, among other types of data. The interface engine 460 can also communicate with the mobile device interface system 112 to authenticate a guest, the mobile communication device, and/or the guest service application 352 with the hotel 106 and/or the mobile device interface system 112

The GUI engine 462 can be configured to present a GUI on a display 354 of the mobile communication device 114 (FIGS. 1, 3). The GUI engine 462 can present a state of the guest service application 352 via the GUI. FIGS. 5 and 6 provide examples of a GUI for displaying states of the guest service application 352.

The PBX engine 464 can be configured to communicate with the PBX 102 to establish calls as an extension of the PBX 102 (FIG. 1). For example, the PBX 102 can receive a call intended for an extension that is associated (e.g., assigned) to the hotel room assignment of the guest. The PBX 102 can resolve the extension by identifying mobile communication device of the guest. For example, the PBX 102 can resolve the hotel room assignment with a guest. The PBX 102 can identify a mobile communication device 114 of the guest. Identifying a mobile communication device 114 of the guest can include identifying a registered mobile communication device 114 of the guest and/or a registered guest service application 352 of the guest. The PBX 102 can then forward the call to the mobile communication device 114. The mobile communication device 114 can receive the call via the PBX engine 464 of the guest service application 352.

The mobile communication device 114 and/or the guest service application 352 can be registered with the mobile device interface system 112 and/or the hotel 106. Registering the mobile communication device 114 and/or the guest service application 352 with either the mobile device interface system 112 and/or the hotel 106 can include registering with the other. For example, a mobile device interface system 112 that registers the mobile communication device 114 can forward the registration of the mobile communication device 114 to the hotel 106. Likewise, a hotel 106 that registers the mobile communication device 114 can forward the registration of the mobile communication device 114 to the mobile device interface system 112.

The PBX engine 464 can be configured to place calls as an extension of the PBX 102. For example, the PBX engine 464 can receive a dialed extension via the GUI 350. The PBX engine 464 can forward the dialed extension and/or a dialing extension to the PBX 102 via the network interface 324. The network interface 324 can forward the extension via the WLAN 108, and/or the network 110. The PBX 102 can receive the dialed extension and/or the dialing extension and create a connection for the call using the dialed extension and/or the dialing extension. In a number of embodiments, the guest service application 352 can receive the dialed extension and identify a dialing extension by resolving the guest service application 352 with an extension associated with a hotel a room assignment of the guest of the hotel 106.

The calls can be connected over a telecommunication network and/or via a local network 107, a WLAN 108, and/or a network 110 in FIG. 1. Calls connected over a network 110 and/or local network 107 can include, for example, connecting calls using voice over IP (VOIP).

The hotel engine 466 can be configured to communicate with the hotel 106, the PMS 104, and/or the PBX 102 to provide guest data. The guest service application 352 can provide guest data via the hotel engine 466, for example, to pre-register a guest with the hotel 106. In a number of embodiments, the guest service application 352 can provide guest data via the hotel engine 466 to register the guest with the hotel 106. The hotel engine 466 can also communicate with the hotel 106, the PMS 104, and/or the PBX 102 to make a reservation, change a reservation, and/or cancel a reservation. The hotel engine 466 can be configured to provide feedback to the hotel 106.

The hotel engine 466 can be configured to request and track services provided by the hotel 106 (e.g., laundry services, room service, pool towel service, spa/fitness service, restaurant). Services can be requested by calling, via the PBX engine 464, an extension associated with a service and/or by requesting a service via the hotel engine 466. Requesting a service via the hotel engine 466 can include communicating with a service computing device of the hotel 106.

The hotel engine 466 can be used to track a requested service. For example, the hotel engine 466 can track a completion of the requested service and/or the progress of the requested service. Tracking the progress of the requested service can include, for example, tracking hotel representatives that are carrying out the service. If a requested service is a request for pool side towels, then tracking the progress of the service can include tracking the location of the towels and/or the hotel representative delivering the towels.

Tracking a representative, a guest, and/or an item within a hotel 106 can include providing a location of the representative, the guest, and/or the item within the hotel 106. A location can be established via a WLAN 108 (FIG. 1). For example, the location of a guest can be ascertained by associating a mobile communication device 114 of the guest with an access point of the WLAN 108.

Tracking a representative, a guest, and/or an item provides the ability to provide services to a guest using a hotel room assignment and/or an extension of the hotel room assignment without requiring the presence of the guest at the hotel room assignment and/or at a phone within the hotel room assignment. The hotel engine 466 can be used to identify a location from which a service is being requested. A hotel 106 can deliver the service at the identified location.

A loyalty engine 468 can be configured to receive/provide loyalty data 341 from/to loyalty programs 118 (FIG. 1). For example, the loyalty engine 468 can receive offers from the loyalty programs 118. The loyalty engine 468 can also provide information, regarding purchases made by a guest, for example, to loyalty programs 118. The loyalty engine 468 can provide information regarding the purchases made by the guest when providing such information would result in benefits from the loyalty programs 118.

The third party services engine 470 can be configured to receive the third party services data 342. The third party services engine 470 can present the third party services data 342 to a user via a GUI. An example, of presenting third party services data 342 via a GUI 350 is provided in FIG. 6.

FIG. 5 graphically illustrates a graphical user interface 350 according to one embodiment. The GUI 350 can include a hotel logo 581, a room number 574, one or more service keys 580, and a banner ad 582.

In certain embodiments, a configuration of the graphical user interface 350 can be customized according to the hotel 106. A configuration of the GUI 350 can include a hotel logo 581, and/or a configuration of the elements in the GUI 350. For example, a logo 350 can be one of one or more hotel logos that correspond to one or more hotels. Furthermore, the color scheme of the GUI 350 can be particular to a hotel 106. For example, a first color scheme and/or logo 581 can be particular to a first hotel and a second color scheme and/or logo 581 can be particular to a second hotel.

In one embodiment, the configuration of the GUI 350 can be received from the mobile device interface system 112 and/or the hotel 106. The configuration of the GUI 350 can be selected or otherwise determined based on a reservation and/or registration of a guest with a particular hotel 106. For example, upon reserving a room and/or registering a guest with a hotel 106, the GUI 350 can be configured to the hotel's 106 configuration.

The GUI 350 can include a room number 574. The room number 574 can be a hotel room assignment for the guest. In one embodiment, the room number 574 can be a caller extension. That is, the room number 574 can be an extension from which calls originating in the guest service application 352 are placed. The room number 574 can be updated via the hotel engine 466 based on a change of the hotel room assignment for the guest.

The GUI 350 can also include an extension field 576. The extension field 576 can be an extension which is being called (e.g., called extension). The extension field 576 can be a room number of the hotel.

The GUI 350 can also include a phone number field 578. The phone number field 578 can receive local phone numbers and/or long distance phone numbers that are being called. In a number of embodiments, the type of call placed using the guest service application 352 may incur additional charges to a guest. For example, calls to extensions of the PBX 102 and/or calls to local phone numbers (e.g., local calls) may not incur additional costs. Local phone numbers can include either room to room and/or phone numbers within a local dialing area to the hotel. Long distance calls may incur additional costs to the guest. As used herein, long distance phone calls include calls made to international phone numbers and/or domestic phone numbers that are not within the local dialing area of the hotel. For example, a long distance call can include an international call and/or domestic long distance call. The extension field 576 and/or the phone number field 578 can be used to place calls.

The service keys 580 can include buttons that include an action upon being touched. Each of the service keys 580 can be configured with an extension of the hotel 106. The extensions used to configure the service keys 580 can correspond with services offered by the hotel. For example, a first service key 580 can be configured with an extension that corresponds to a restaurant within the hotel 106 and a second service key 580 can be configured with an extension that corresponds to maintenance. The service keys 580 can be labeled using text, images, and/or icons. The text, images, and/or icons can correspond with the services associated with each service key 580. For example, a first service key 580 that is configured to call an extension corresponding to a restaurant can have text, images, and/or icons that are associated with the restaurant.

The service keys 580 can include a message waiting service key. The message waiting service key can be configured with an extension of the hotel room assignment of the guest. The message waiting service key can be used to access messages. In one embodiment, the message waiting service key can blink red when a new message is received.

The service keys 580 can include a directory service key, a front desk service key, and/or an information service key. A directory service key can provide the guest with a directory of services offered by the hotel 106 and/or a third party services offered by the third party service providers 119. The directory of services accessed via the directory service key can include local third party services and/or non-local third party services.

The front desk service key can be configured with an extension that corresponds to a front desk. That is, the front desk service key can be used to place a call to the front desk. The information service key can be configured to provide hotel information. Hotel information can include an address of the hotel, a telephone number of the hotel, and/or a fax number of the hotel, among other information associated with the hotel.

The banner add 582 can advertise third party services. Space in the banner add 582 can be purchased by a third party service provider 119. The space in the banner add 582 can be purchased from the mobile device interface system 112 and/or from the hotel 106.

In one embodiment, the GUI 350 can also have language. For example, the GUI 350 can be configured to present the state of the guest service application 352 in one or more languages. Furthermore, the GUI 350 can be configured to employ a language that is associated with a hotel chain and/or with a particular hotel in a particular location. For example, the GUI 350 can be configured to use a first language for a first hotel belonging to a hotel chain and a second language for a second hotel belonging to the hotel chain. The GUI 350 can be configured to provide the guest with the ability to edit the language options. For example, a guest can change the language of GUI 350 from a first language to a second language.

As can be appreciated, other service keys (or "hot key") and arrangements and configurations of the same are possible and may be determine based on the hotel.

FIG. 6 graphically illustrates a graphical user interface 350 according to one embodiment. The GUI 350 can be presented to a user in response to the user selecting a directory service key. The GUI 350 includes a hotel logo 581, and a room number 574. The GUI 350 can also include paid third party services 679, third party services 683, and/or a banner ad 582.

In a number of embodiments, third party service providers 119 (FIG. 1) can pay a mobile device interface system 112 (FIGS. 1, 2) to display the paid third party services 679 before the third party service 683. A third party service provider 119 can also pay to have their services displayed in the banner ad 582. The banner ad 582 and/or the paid third party service 679 can be included in an advertisement cost structure associated with the advertising third party services.

In a number of examples, the third party services 683 and/or the paid third party service 679 can be organized by services, distance (e.g., proximity to a hotel), and/or price. The third party services 683 and/or the paid third party service 679 can be organized according to other criteria.

Selecting the third party service 683 and/or the paid third party services 679 can provide a guest with further information regarding the corresponding third party services. For example, selecting a listed third party service 683 can provide a guest with the website and/or phone number of the third party service provider, a description of the third party service, a cost of the third party service, and/or directions to the third party services, among other data that can be included in the listing.

Figure 7:
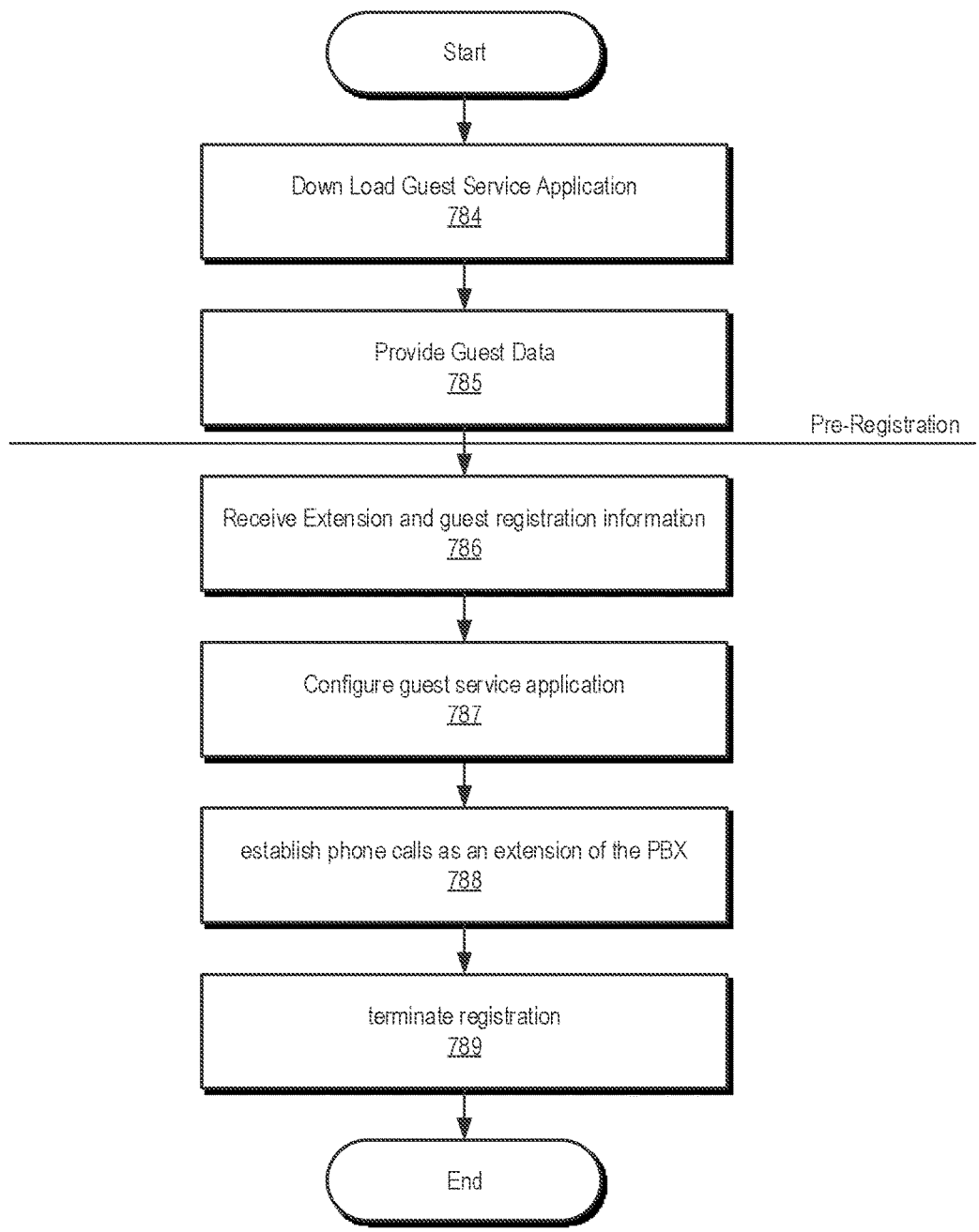
FIG. 7 is a flowchart of a method for hotel communications according to one embodiment.

FIG. 7 is a flowchart of a method for hotel communications according to one embodiment. Specifically, FIG. 7 is a flow chart for a method of a mobile communication device providing hotel communications.

A mobile communication device can download 784 or otherwise obtain a guest service application. The guest service application can be obtained, for example, by downloading 784 the guest service application from a participating hotel, a mobile device interface system, and/or an application store or market place (e.g., iTunes®, Google Play™).

A guest can instruct or otherwise authorize the guest service application on the mobile communication device to provide 785 guest data to a hotel before registering with the hotel (e.g., pre-registration). The guest data can be provided by a guest via the GUI to the guest service application. The guest data can be entered using a GUI on the mobile communication device and can be transmitted to the hotel via a hotel engine and/or can be transmitted to the mobile device interface system via an interface engine. The guest can provide the guest data to obtain a reservation with the hotel.

One or more extensions of a PBX and/or guest registration information can be received. The extensions and/or the guest registration information can be received 786 after a guest registers with the hotel. The guest can register physically and/or through the guest service application.

The guest service application can be configured 787. The guest service application can be configured 787 using the one or more extension and/or the guest registration information. In certain embodiments, the guest service application can also be configured 787 using loyalty data, third party services data, and/or hotel data, among other types of data.

One or more phone calls can be established 788 as an extension of the PBX. The phone calls can be established using the received 786 extensions.

A registration can be terminated 789 using the guest service application. The registration can be terminated 789 by checking out of the hotel electronically and/or physically. Terminating 789 a hotel registration can include deactivating the guest service application's ability to place and receive calls as an extension of the PBX. The guest service application's ability place and receive calls can be deactivated via the PBX, the mobile device interface system and/or the guest service application. For example, the PBX can an ignore request to establish phone calls originating from the guest service application. The mobile device interface system can also configure the guest service application by remove the capability to place and receive calls as an extension of the PBX.

Figure 8:
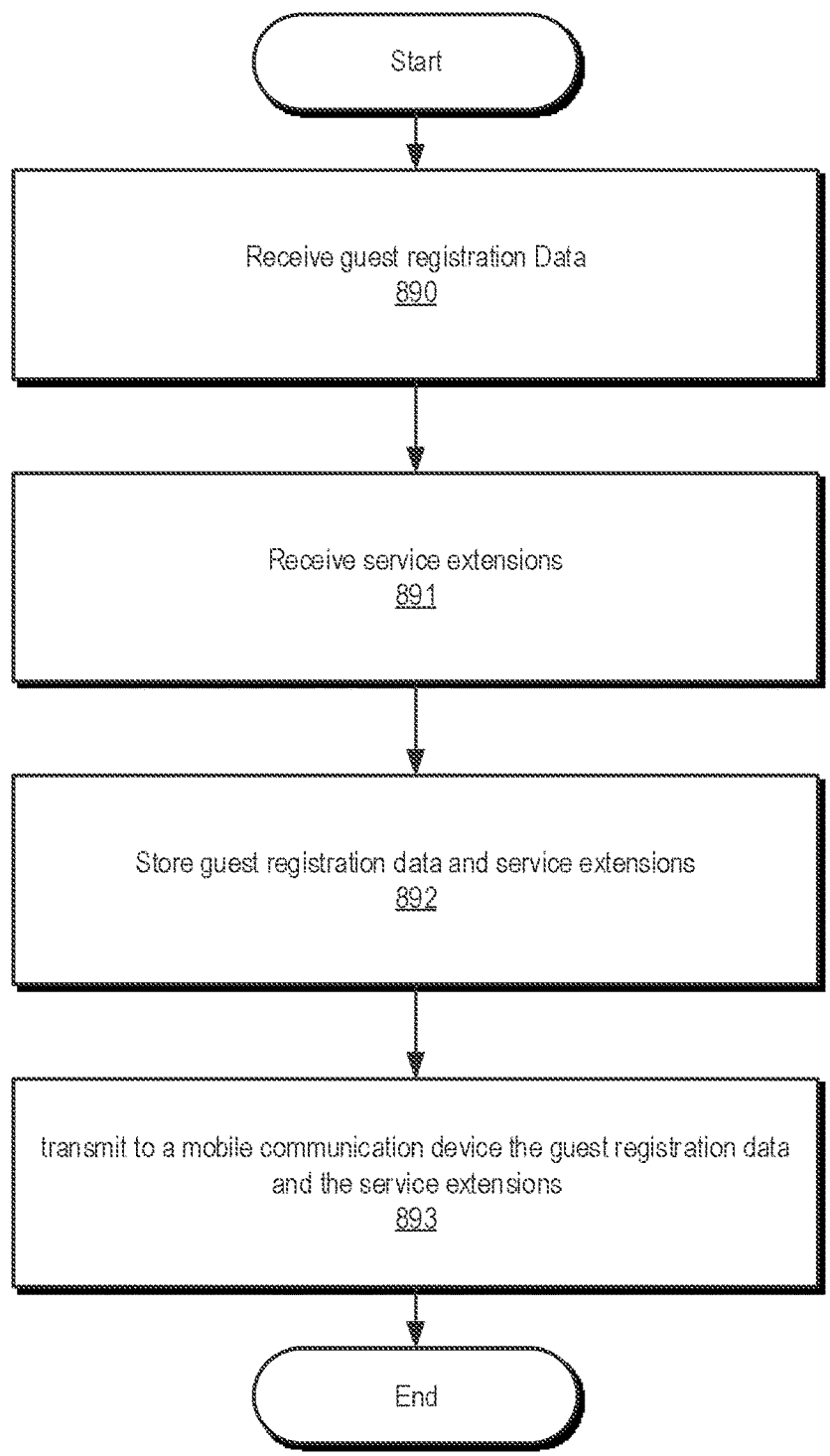
FIG. 8 is a flowchart of a method for hotel communications according to one embodiment.

FIG. 8 is a flowchart of a method for hotel communications according to one embodiment. Specifically, FIG. 8 is a flow chart for a method of a mobile device interface system providing hotel communications The mobile device interface system can receive 890 guest registration information from a PMS. The mobile device interface system can receive 891 one or more service extensions from a PBX. The mobile device interface system can store 892 the guest registration information and the service extensions. The mobile device interface system can transmit 893 the guest registration data and/or the one or more service extensions to a mobile communication device. The guest registration data and/or the one or more service extensions can be transmitted to configure a guest service application on the mobile communication device to place and receive calls as an extension of the PBX associated with a hotel room assignment, including calls to the one or more guest service

EXAMPLE EMBODIMENTS

Some examples of embodiments of communication systems and methods are provided below.

Example 1

A mobile communication device for communicating with a property such as a hotel, comprising: one or more processors; electronic memory accessible by the one or more processors, the electronic memory to store guest registration data, including a room assignment and extensions on a private branch exchange system (PBX) of the property; a network interface to enable communication with one or more computing devices via a wireless local area network (WLAN) operating on the premises of the property and comprising one or more access points to an electronic communication network, the one or more computing devices including a computing device of the PBX; a display; a graphical user interface for presenting, on the display, one or more guest service keys for services provided by the property; a guest service application to, by the one or more processors: receive, by the network interface, guest registration data for a guest of the property, including the room assignment and one or more guest service extensions on the PBX; store the guest registration data in the electronic memory to configure the one or more guest service keys with the one or more guest service extensions; and based on a selection of a key of the one or more guest service keys, communicate directly with the PBX, by the network interface, to place and receive calls as an extension of the PBX, such as may be associated with a hotel room assignment.

Example 2

The device of example 1, wherein the guest service application, based on input received via the graphical user interface, communicates directly with the PBX to place and receive calls including room to room calls as an extension of the PBX associated with the hotel room assignment.

Example 3

The device of example 1, wherein the mobile communication device can place and receive calls by communicating with a telecommunications network.

Example 4

The device of example 1, wherein the guest service application: receives, by the network interface, advertisement data that provides third party services; updates the graphical user interface to display the advertisement data; and launches display of a third party website based on an input received via the graphical user interface.

Example 5

The device of example 1, wherein the guest service application: receives third party services that are offered within a predetermined distance from the property; updates the graphical user interface to display the third party services based on an interaction with a directory key presented by the graphical user interface; and launches display of a third party website based on input received via the graphical user interface.

Example 6

The device of example 5, wherein the graphical user interface presents, on the display, a directory key for providing a directory of the third party services.

Example 7

The device of example 1, wherein the graphical user interface presents, on the display, an information key for providing information to a guest.

Example 8

The device of example 7, wherein the information includes at least one of the room assignment, an address of the property, a telephone number of the property, and a fax number of the property.

Example 9

The device of example 1, wherein the graphical user interface presents, on the device, a room number of the room assignment of the guest.

Example 10

The device of example 1, the guest service application further to, by the one or more processors: receive a first extension number that represents an extension of the room assignment of the guest; receive a second extension number that represents a dialed extension, from the graphical user interface; and forward, from the guest service application over the WLAN, the first extension and the second extension to the PBX to establish a telephone call between the device and the second extension.

Example 11

A method for communicating with a property, such as a hotel, comprising: receiving, via a network interface of a mobile communication device comprising one or more processors, a guest service application; pre-registering a guest at the property by forwarding, via the network interface, guest data received via the guest service application; receiving, via the network interface, guest registration data and one or more PBX extensions from a mobile device interface system in response to the guest registering at the property; configuring, via the one or more processors, the guest service application using the guest registration data and the one or more PBX extensions; and establishing a phone call as an extension of the PBX.

Example 12

The method of example 11, further comprising terminating a registration of the guest at the property via the guest service application using the guest registration data.

Example 13

The method of example 12, wherein terminating the registration of the guest at the property deactivates the guest service application ability to place and receive phone calls as an extension of the PBX.

Example 14

The method of example 11, further comprising deactivating the guest service application ability to place and receive phone calls in response to receiving a termination of registration confirmation.

Example 15

The method of example 14, wherein deactivating the guest service application ability to place and receive phone calls includes removing the guest registration data and the one or more PBX extensions from the guest service application.

Example 16

The method of example 11, further comprising mapping a location of the mobile communication device in the property in response to interacting with one or more access points of the WLAN.

Example 17

The method of example 11, further comprising: receiving property representative information in response to placing and receiving one or more phone calls; and mapping the location of a property representative in response to receiving the property representative information.

Example 18

The method of example 11, wherein establishing the phone call comprises placing the phone call.

Example 19

The method of example 18, wherein placing the phone call further comprises forwarding to the PBX, via the network interface, one or more extensions from the one or more PBX extensions.

Example 20

The method of example 11, wherein establishing the phone call comprises receiving the phone call from the PBX.

Example 21

A computer-readable storage medium having stored thereon instructions that, when implemented by a computing device, cause the computing device to perform operations for communicating with a hotel, the operations comprising: receiving, via a network interface of a mobile communication device comprising one or more processors, a guest service application; pre-registering a guest at the hotel by forwarding, via the network interface, guest data received via the guest service application; receiving, via the network interface, guest registration data and one or more PBX extensions from a mobile device interface system in response to the guest registering at the hotel; configuring, via the one or more processors, the guest service application using the guest registration data and the one or more PBX extensions; and establishing a phone call as an extension of the PBX.

Example 22

A mobile device interface system comprising: one or more processors; electronic memory accessible by the one or more processors, the electronic memory to store one or more guest service extensions of one or more private branch exchange system (PBX) extensions, the one or more guest service extensions for guest services that are provided by a hotel; a network interface to enable communication with a property management system (PMS) over an electronic communication network; a service extension engine to, by the one or more processors via the network interface, obtain the one or more guest service extensions and store the one or more guest service extensions in the electronic memory; a mobile device configuration engine to, by the one or more processors via the network interface: receive guest registration data from the PMS, including the hotel room assignment; and transmit to a mobile communication device the guest registration data and the one or more guest service extensions to configure a guest service application on the mobile communication device to place and receive calls as an extension of the PBX associated with a hotel room assignment, including calls to the one or more guest service.

Example 23

The system of example 22, wherein the one or more PBX extensions for guest services are accessed via the guest service application using guest service keys presented on a graphical user interface of the guest service application on the mobile communication device.

Example 24

The system of example 22, wherein the one or more PBX extensions include a room extension for the hotel room assignment.

Example 25

The system of example 22, wherein the one or more PBX extensions for guest services include a message waiting extension to provide access to messages for an extension of the hotel room assignment.

Example 26

The system of example 22, wherein the one or more PBX extensions for guest services include a front desk extension.

Example 27

The system of example 22, wherein the one or more PBX extensions for guest services include an extension for placing a call to a phone number local, either room to room or within a local dialing area, to the hotel.

Example 28

The system of example 22, wherein the one or more PBX extensions for guest services include an extension for placing a call to a phone number that is not local, be it domestic long distance or international, to the hotel.

Example 29

The system of example 22, wherein the electronic communication network is coupled to a local network that is local to the hotel.

Example 30

The system of example 22, wherein the electronic communication network is coupled to a local area network that is either wired or wireless.

Example 31

The system of example 30, wherein the mobile device configuration engine transmits the guest registration data and the one or more PBX extensions via the wireless local area network (WLAN).

Example 32

A method for communicating with a hotel comprising: receiving guest registration data from a property management system (PMS), including the hotel room assignment; receiving one or more guest service extensions of one or more private branch exchange system (PBX) extensions from the PMS; storing the one or more guest service extensions and the guest registration data in an electronic memory; and transmitting to a mobile communication device the guest registration data and the one or more guest service extensions to configure the guest service application on the mobile communication device to place and receive calls as an extension of a PBX associated with a hotel room assignment, including calls to the one or more guest service.

Example 33

The method of example 32, further comprising: receiving advertisement data from one or more third parties; and transmitting to the mobile communication device the advertisement data to the guest service application on the mobile communication device to provide the guest with advertisement or a directory of third party services within a predetermined distance from the hotel.

Example 34

The method of example 32, further comprising: providing the guest registration data to a loyalty program system; receiving loyalty program data from one or more third parties; and transmitting to the mobile communication device the loyalty program data to configure the guest service application on the mobile communication device to provide the guest with loyalty program offers.

Example 35

A computer-readable storage medium having stored thereon instructions that, when implemented by a computing device, cause the computing device to perform operations for communicating with a hotel, the operations comprising: receiving, via a network interface of a mobile device interface system comprising one or more processors, guest registration data from a property management system (PMS), including the hotel room assignment; receiving one or more guest service extensions of one or more private branch exchange system (PBX) extensions from the PBX; storing the one or more guest service extensions and the guest registration data in an electronic memory of the mobile device interface system; transmitting to a mobile communication device the guest registration data and the one or more guest service extensions to configure the guest service application on the mobile communication device to place and receive calls as an extension of a PBX associated with a hotel room assignment, including calls to the one or more guest service; and receiving termination of registration to terminate a registration with the hotel.

Example 36

The computer-readable storage medium of example 35, wherein the termination of registration data is received from the mobile communication device.

Example 37

The computer-readable storage medium of example 36, further comprising: transmitting the termination of registration data to the PMS to terminate the registration with the hotel; and transmitting a confirmation of termination to the mobile communication device to configure the guest service application on the mobile communication device to inhibit the mobile communication device from placing and receiving calls as an extension of the PBX associated with the hotel room assignment.

Example 38

The computer-readable storage medium of example 35, wherein the termination of registration data is received from the mobile device interface system.

Example 39

The computer-readable storage medium of example 38, further comprising: transmitting a confirmation of termination to the mobile communication device to configure the guest service application on the mobile communication device to inhibit the mobile communication device from placing and receiving calls as an extension of the PBX associated with the hotel room assignment.

Example 40

A hotel communication system comprising: a registration system to receive guest data from the mobile communication device; create guest registration data from the guest data; a property management system (PMS) to coordinate operational functions of the hotel including guest registration, the PMS to communicate the guest registration data including the hotel room assignment to the private branch exchange system (PBX) electronically and to a mobile device interface system to provide to a mobile communication device; a wireless local area network (WLAN) operable on the premises of the hotel to: lace and receive calls for the mobile communication device; provide the calls to the PBX; and the PBX to provide intercommunication between one or more extensions of the PBX, the PBX to: provide the one or more extensions to the mobile device interface system to provide to the mobile communication device, the one or more extensions being configured for the guest registration data including the hotel room assignment; and place and receive the calls for the mobile communication device as an extension of the PBX associated with the hotel room assignment.

Example 41

A method for communicating with a hotel comprising: receiving guest data at a registration system; registering the guest using the guest data; configuring one or more extensions of a private branch exchange system (PBX) using registration data including a hotel room assignment; forwarding the guest registration data and the one or more extensions to a mobile device interface system to configure a mobile communication device, the one or more extensions including an extension of the PBX associated with the hotel room assignment; and resolving calls to the extension of the PBX associated with the hotel room assignment and the mobile communication device.

Example 42

The method of example 41, further comprising receiving calls at the PBX for the extension associated with the hotel room assignment.

Example 43

The method of example 42, wherein resolving calls includes resolving the received call for the extension associated with the hotel room assignment to the mobile communication device.

Example 44

The method of Example 43, further comprising providing the received call to the mobile communication device via a wireless local area network (WLAN).

Example 45

The method of Example 41, further comprising receiving a call at a WLAN from the mobile communication device.

Example 46

The method of Example 45, wherein resolving calls includes resolving the received call from the mobile communication device with the extension associated with the hotel room assignment.

Example 47

The method of Example 46, further comprising placing the received call to at least one or more of the one or more extensions of the PBX.

Example 48

A computer-readable storage medium having stored thereon instructions that, when implemented by a computing device, cause the computing device to perform operations for communicating with a hotel, the operations comprising: receiving guest data at a registration system; registering the guest using the guest data; configuring one or more extensions of a private branch exchange system (PBX) using registration data including a hotel room assignment; forwarding the guest registration data and the one or more extensions to a mobile device interface system to configure a mobile communication device, the one or more extensions including an extension of the PBX associated with the hotel room assignment; and resolving calls to the extension of the PBX associated with the hotel room assignment and the mobile communication device.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

What is claimed is:

1. A mobile device interface system comprising:
one or more processors;
electronic memory accessible by the one or more processors, the electronic memory to store one or more guest service extensions of one or more private branch exchange system (PBX) extensions, the one or more guest service extensions for guest services that are provided by a hotel;
a network interface to enable communication with a property management system (PMS) over an electronic communication network;
a service extension engine to, by the one or more processors via the network interface, obtain the one or more guest service extensions and store the one or more guest service extensions in the electronic memory;
a mobile device configuration engine to, by the one or more processors via the network interface:
receive guest registration data from the PMS, including the hotel room assignment; and
transmit to a mobile communication device the guest registration data and the one or more guest service extensions to configure a guest service application on the mobile communication device to place and receive calls as an extension of the PBX associated with a hotel room assignment, including calls to the one or more guest service extensions.

2. The system of claim 1, wherein the one or more PBX extensions for guest services are accessed via the guest service application using guest service keys presented on a graphical user interface of the guest service application on the mobile communication device.

3. The system of claim 1, wherein the one or more PBX extensions include a room extension for the hotel room assignment.

4. The system of claim 1, wherein the one or more PBX extensions for guest services include a message waiting extension to provide access to messages for an extension of the hotel room assignment.

5. The system of claim 1, wherein the one or more PBX extensions for guest services include a front desk extension.

6. The system of claim 1, wherein the one or more PBX extensions for guest services include an extension for placing a call to a phone number local, either room to room or within a local dialing area, to the hotel.

7. The system of claim 1, wherein the one or more PBX extensions for guest services include an extension for placing a call to a phone number that is not local, be it domestic long distance or international, to the hotel.

8. The system of claim 1, wherein the electronic communication network is coupled to a local network that is local to the hotel.

9. The system of claim 1, wherein the electronic communication network is coupled to a local area network that is either wired or wireless.

10. The system of claim 9, wherein the mobile device configuration engine transmits the guest registration data and the one or more PBX extensions via the wireless local area network (WLAN).

* * * * *